(12) United States Patent
Donlin et al.

(10) Patent No.: US 8,078,907 B2
(45) Date of Patent: Dec. 13, 2011

(54) FAILSOFT SYSTEM FOR MULTIPLE CPU SYSTEM

(75) Inventors: Patrick John Donlin, Deephaven, MN (US); Samuel Edward Watters, Bloomington, MN (US)

(73) Assignee: Silicon Graphics, Inc., Mountain View, CA (US)

( * ) Notice: Subject to any disclaimer, the term of this patent is extended or adjusted under 35 U.S.C. 154(b) by 552 days.

(21) Appl. No.: 11/334,526

(22) Filed: Jan. 19, 2006

(65) Prior Publication Data

US 2007/0168716 A1    Jul. 19, 2007

(51) Int. Cl.
*G06F 11/00* (2006.01)
(52) U.S. Cl. .......................................... 714/13; 714/4.11
(58) Field of Classification Search ................. 714/4, 10, 714/13, 11, 4.11, 4.12, 4.2
See application file for complete search history.

(56) References Cited

U.S. PATENT DOCUMENTS

| | | | |
|---|---|---|---|
| 4,868,818 A * | 9/1989 | Madan et al. | 714/4 |
| 5,065,308 A * | 11/1991 | Evans | 714/11 |
| 5,812,757 A * | 9/1998 | Okamoto et al. | 714/11 |
| 5,815,651 A * | 9/1998 | Litt | 714/10 |
| 6,002,851 A * | 12/1999 | Basavaiah et al. | 714/4 |
| 6,108,699 A * | 8/2000 | Moiin | 709/221 |
| 6,199,179 B1 * | 3/2001 | Kauffman et al. | 714/26 |
| 6,314,526 B1 * | 11/2001 | Arendt et al. | 714/4 |
| 6,353,844 B1 * | 3/2002 | Bitar et al. | 718/102 |
| 6,438,705 B1 * | 8/2002 | Chao et al. | 714/4 |
| 6,460,149 B1 * | 10/2002 | Rowlands et al. | 714/43 |
| 6,594,785 B1 * | 7/2003 | Gilbertson et al. | 714/48 |
| 6,711,700 B2 * | 3/2004 | Armstrong et al. | 714/23 |
| 6,789,213 B2 * | 9/2004 | Kumar et al. | 714/13 |
| 6,944,785 B2 * | 9/2005 | Gadir et al. | 714/4 |
| 7,089,461 B2 * | 8/2006 | Gilbert et al. | 714/47 |
| 7,185,226 B2 * | 2/2007 | Chen et al. | 714/13 |
| 7,275,180 B2 * | 9/2007 | Armstrong et al. | 714/13 |
| 7,287,180 B1 * | 10/2007 | Chen et al. | 714/4 |
| 7,325,163 B2 * | 1/2008 | Kondajeri et al. | 714/25 |
| 7,404,105 B2 * | 7/2008 | Arai | 714/13 |
| 7,426,657 B2 * | 9/2008 | Zorek et al. | 714/13 |
| 7,478,272 B2 * | 1/2009 | Armstrong et al. | 714/10 |
| 2002/0049845 A1 * | 4/2002 | Sreenivasan et al. | 709/226 |
| 2004/0093541 A1 * | 5/2004 | Jain et al. | 714/724 |
| 2004/0139374 A1 * | 7/2004 | Meaney et al. | 714/48 |
| 2005/0172164 A1 * | 8/2005 | Fox et al. | 714/13 |
| 2005/0283658 A1 * | 12/2005 | Clark et al. | 714/11 |
| 2006/0294337 A1 * | 12/2006 | Hartung et al. | 711/173 |

* cited by examiner

*Primary Examiner* — Robert Beausoliel, Jr.
*Assistant Examiner* — Elmira Mehrmanesh
(74) *Attorney, Agent, or Firm* — Sunstein Kann Murphy & Timbers LLP

(57) ABSTRACT

A cpu-set type multiprocessor system allows a cpu of a cpu-set that has a hardware exception to disable itself and notify the system. The system assigns processes of the cpu-set that include the problem cpu to another cpu-set. The disabling of the problem cpu and transfer of the related processes to another cpu-set allows the system to failsoft so that other cpu-sets the multiprocessor system can continue to run and a recovery of the processes being run on the problem cpu-set occurs.

18 Claims, 11 Drawing Sheets

FAILSOFT SYSTEM FOR MULTIPLE CPU SYSTEM

BACKGROUND OF THE INVENTION

1. Field of the Invention

The present invention is directed to a system that allows a multiprocessor system with cpu-set capability to incur a hardware failure and continue running and, particularly, to assign the processes of the cpu-set with the failed processor to a new cpu-set 2. Description of the Related Art Large multiprocessor systems have complex operating systems that allow multiple processors (CPUs) to work on the same problem or data set. These systems often have 512 processors that are used to tackle one or more tasks. It is often the case that when one cpu of such a system fails it causes the system to fail.

One means of preventing a complete system failure is to use partitioning capability to subdivide a large system into a cluster of smaller systems. This can be effective at fire walling a single processor failure to the partition node. However, partitioning changes require a reboot of all nodes to reconfigure, and a large number of parallel programming applications cannot readily run across a cluster. What is needed is a system that does not require such rebooting overhead but that can firewall a failed cpu.

These large systems can also be divided into sets of CPUs (cpu-sets) that can also be allocated to performing particular functions. The cpu-set feature is very dynamic and provides rapid run time ability to soft partition a large system into subsets, yet reconfigure literally on the fly. This reduces the rebooting overhead but certain fatal hardware errors, such as CPU instruction cache errors, can still cause the entire system to halt.

What is needed to reduce total system failures and reduce overhead is a cpu-set type system where hardware errors can instead halt some processors while the remaining system continues to run.

SUMMARY OF THE INVENTION

It is an aspect of the present invention to provide a cpu-set type system where hardware errors instead of causing system failure can instead halt some processors while the remaining system continues to run.

It is an aspect of the present invention to provide a cpu-set type system where hardware errors do not prevent processes running on processors of a related processor set from being recovered.

The above aspects can be attained by a system that allows a processor that has a problem, such as a hardware exception, to disable itself and notify the system. The system assigns processes of a set of processors that include the problem processor to another cpu-set. The disabling of the problem processor and transfer of the related processes allows the system to failsoft so that other sets of processors of the system can continue to run.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

What is failsoft? It is the capability to respond to a fatal hardware error by NOT crashing. The goal is to significantly increase the mean time between failure (MTBF) on systems experiencing survivable panics. As the majority of large systems are configured to use cpu-sets, failsoft attempts to contain a fatal hardware error to a failed cpu-set. Instead of crashing the entire system upon a fatal hardware error, only the cpu-set of the failure is idled. The running job on the idled cpu-set is halted, and no further work is allowed to be submitted to that cpu-set. The other cpus within the cpu-set are rescheduled by the system to continue doing useful work. The failed cpu is held in an isolated, unusable state pending administrative action to remedy.

Traditional RAS (Resiliency, Availability and Serviceability) capabilities focus on the lower levels of hardware support for the processors and memory controllers. These capabilities must still be developed to the fullest extent for multiple processor systems but generally are hidden from the higher levels of the kernel. Failsoft addresses processor failures at the higher kernel abstraction levels, interacting with the cpu scheduler, cpu-sets, and batch schedulers. This is a new concept important for very large system configurations or high availability systems to survive a larger class of hardware failures.

In the embodiments of the present invention discussed herein, when a particular hardware failure that is expected to initiate a system halt occurs, the failing processor is tested to determine if it is running in an exclusive cpu-set. If this is true, then all processors that are members of that cpu-set are stopped and no additional work is accepted by the cpu-set. The entire system continues to run. All other processes in other cpu-sets continue to run without interruption. An alert message notifies the system administrator or controller of the cpu-set halt. At the time of choosing for the administrator, the system can be stopped for maintenance, thereby preventing the loss of potentially hundreds of user jobs.

Figure 1:
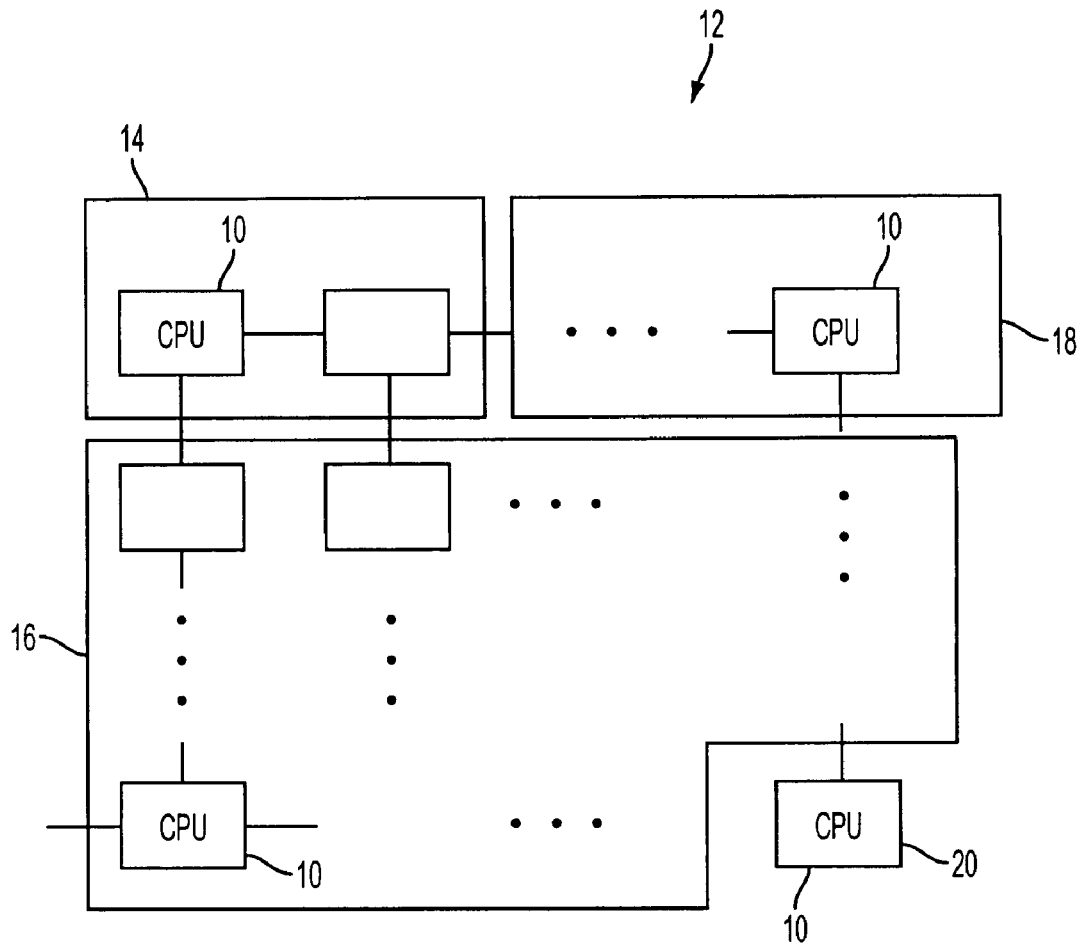
FIG. 1 depicts a multiple processor system.

FIG. 1 illustrates a configuration of multiple cpus 10 coupled in an array that is one type of multiple processor system 12 that can be used to process complex tasks. These processors or cpus can be organized into cpu-sets 14, 16 and 18 where each set is tasked with a different problem or subproblem. When one of the cpus 10 in one of the sets fails, such as a cpu in set 18, that cpu-set 18 is idled. These cpus typically have their own cache, general-purpose memory and other resources, such as disk storage, as well as shared common memory and other resources that for convenience are not shown. Typically, in such systems one of the processors, such as processor 20, is designated as the system control processor and typically assigned as cpu0. The system control processor itself resides in a global cpu-set, as with all other cpus not assigned to cpu-sets. This system control processor 20 assigns cpus to cpu-sets, assigns tasks to the cpus and cpu-sets and, in the present invention, detects the failure of a cpu or cpu-set, alerts operators and reschedules or reassigns the tasks of the failed cpu or cpu-set to another cpu or cpu-set. The cpus can communicate among each other through various conventional mechanisms, such as common memory, semaphores, etc.

Figure 2:
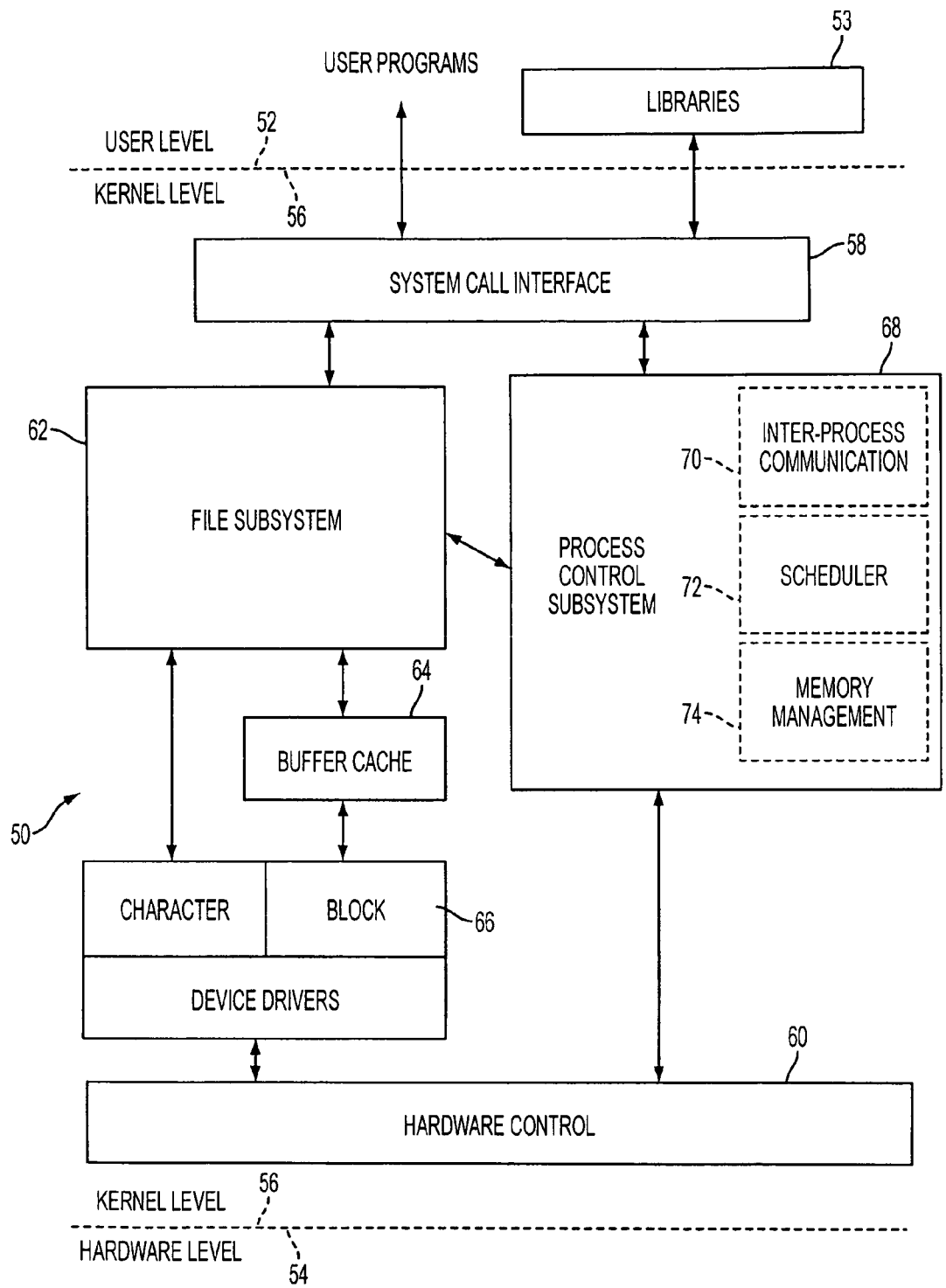
FIG. 2 shows kernel level components of a processor of the system.

A typical operating system based computing environment 50, such as the UNIX environment to which the embodiments of the present invention can be applied, includes several levels as depicted in FIG. 2. Similar environments can be found in other operating system environments and the present can be applied to those environments as well as others that are less similar. In the typical operating system environment, a user space or level 52 is provided in which user applications and programs are executed and in which the various libraries 53 data, programs, etc. are assessed and used. A hardware space or level 54 is also provided where the hardware resides and operates. Between the user level 52 and the hardware level 54, exists a kernel space or level 56 in which the kernel of the system operates.

The kernel is a program that constitutes the central core of a computer operating system. It has complete control over everything that occurs in the system. The kernel is the first part of the operating system to load into the main memory (RAM) during booting, and it remains in the memory for the entire duration of the computer session. Because the code that makes up the kernel is needed continuously, it is usually loaded into a protected area of memory, which prevents it from being overwritten by other, less frequently used parts of the operating system or by application programs. Access to the kernel is limited to individuals with a proper level of authority, which is the "superuser". The kernel performs its tasks (e.g. executing processes and handling hardware and software interrupts) in kernel space, whereas everything a user normally does (e.g. writing text in a text editor or running graphical programs) is done in user space. This separation is provided in order to prevent user data and kernel data from interfering with each other and thereby diminishing performance or causing the system to become unstable (and possibly crashing). The kernel provides basic services for all other parts of the operating system, typically including memory management, process management, file management and I/O (input/output) management (i.e., accessing the peripheral devices). These services are requested by other parts of the operating system or by application programs through a specified set of program interfaces referred to as system calls.

Process management is the part of the kernel that ensures that each process gets its turn to run on the processor 10 and that the individual processes do not interfere with each other by writing to their areas of memory.

The contents of a kernel vary considerably according to the operating system, but they typically include a scheduler, which determines how the various processes share the kernel's processing time (including in what order), a supervisor, which grants use of the computer to each process when it is scheduled, an interrupt handler, which handles all requests from the various hardware devices (such as disk drives and the keyboard) that compete for the kernel's services and a memory manager, which allocates the system's address spaces among all users of the kernel's services.

The typical UNIX kernel level 56 (see FIG. 2) includes a system call interface 58 that interacts with the user level 52 and hardware control 60 that interacts with the hardware level 54. The kernel level 56 also includes a file sub-system 62 that controls access to files within the system as well as access to the various hardware devices, such as a printer, through conventional buffers 64 and drivers 66. The UNIX kernel level 56 also includes a process control system 68 that controls the processes and includes an inter-process communication task 70, a scheduler 72 and a memory manager 74.

Figure 3:
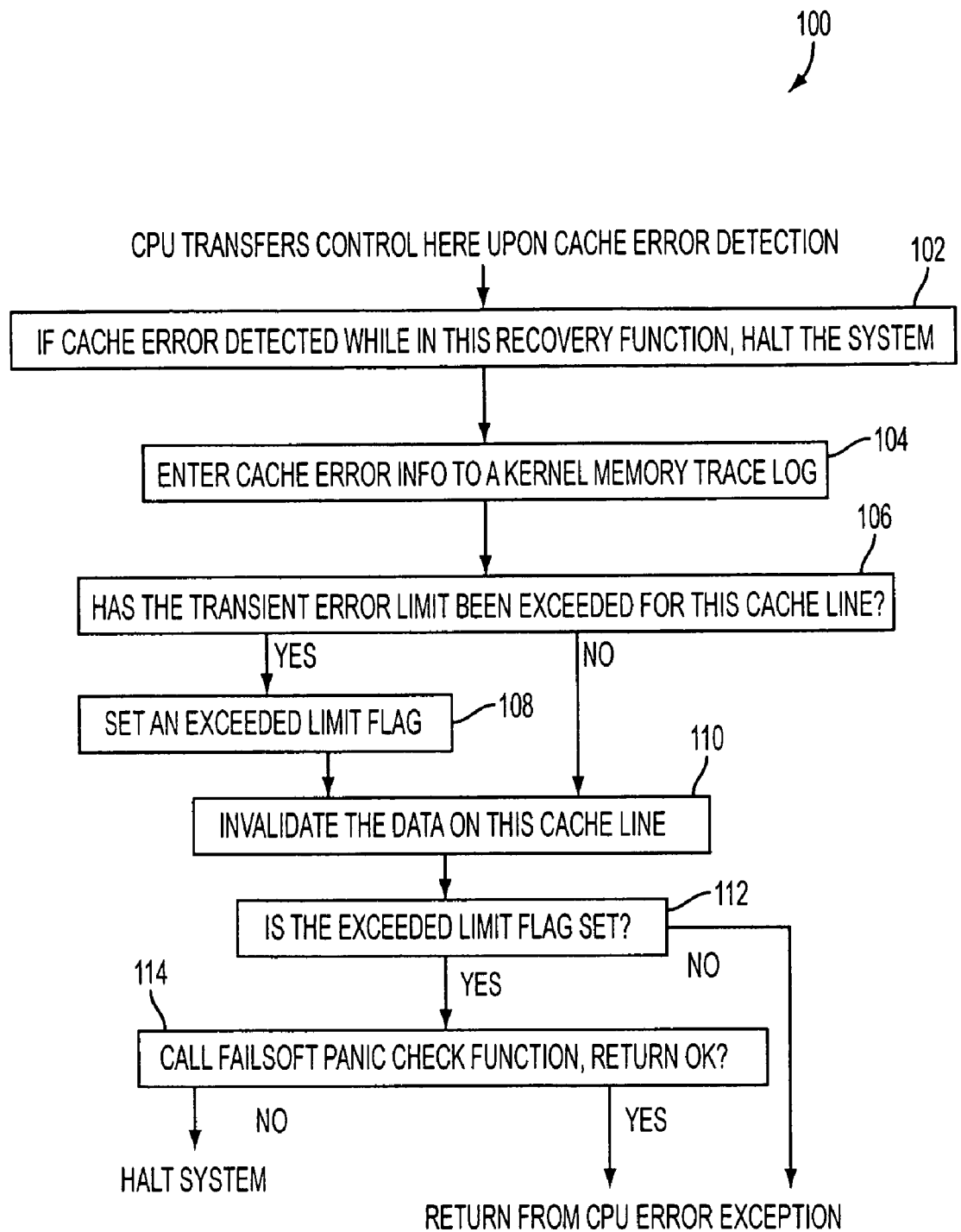
FIG. 3 depicts a part of the process for handling hardware errors.

When a cpu of a cpu-set detects a hardware failure, process control for the cpu is transferred to an error handling process 100 (FIG. 3) where it is determined 102 whether a cache error has been detected while already in the midst of handling a prior cache error. If so, the system is halted. If not, the error is entered 104 into a trace log and a check against a transient error threshold for the cache line is performed 106. If the limit has been exceeded, the limit flag is set 108. The system then invalidates the data of the cache line and calls 114 the failsoft check function. Upon return from the check, if the check is not "ok", the system is halted. If the check is "ok", a return from the error exception is performed.

Figure 4:
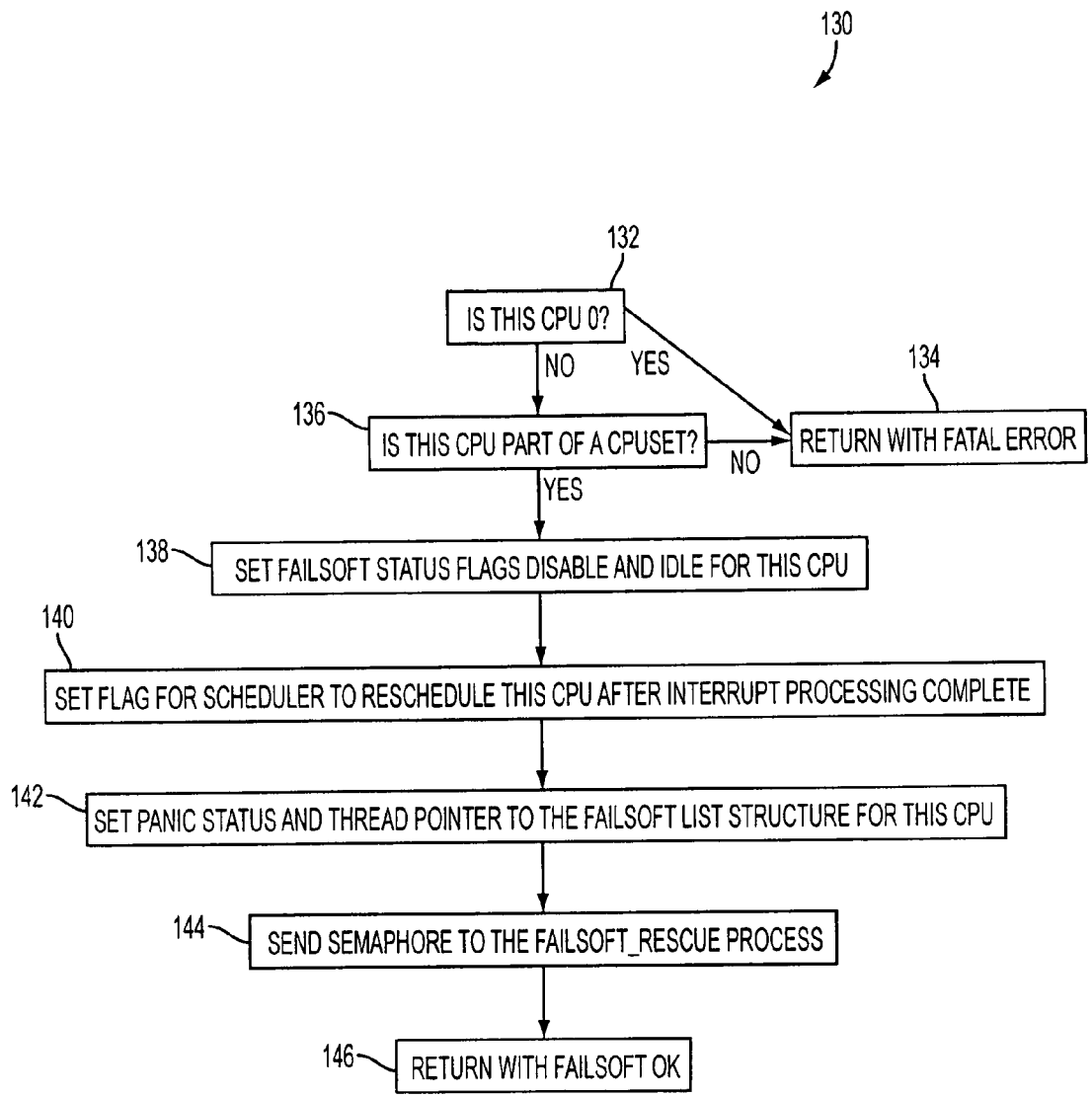
FIG. 4 shows a failsoft check function.

The failsoft panic check function 130 (FIG. 4) determines 132 if this cpu is cpuo, then a fatal error is returned 134 (a return no OK is passed back to operation 114). If not cpu0, the system then checks 136 to see if the cpu is part of a cpu-set. If not, a fatal error is again returned 134. When the cpu is part of a set, the failsoft status flags for disabling this cpu and idling this cpu are set 138. Then, a flag is set 140 for the scheduler to reschedule this cpu after the interrupt processing is complete. The process 130 then sets 142 the panic status and thread pointer to the failsoft list structure (see FIG. 5) for this cpu. A message is then sent 144 to the control processor to start the rescue process and the call is returned 146 "ok".

Figure 5:
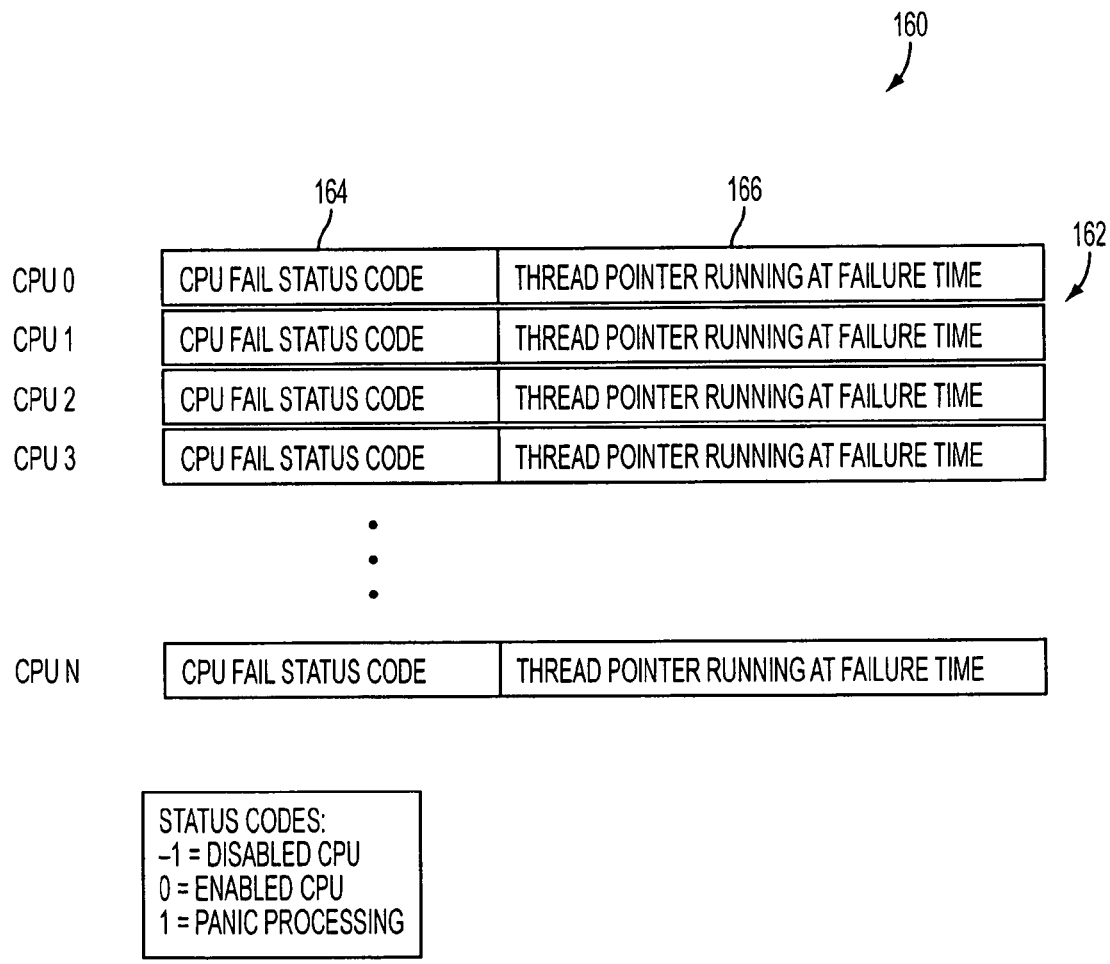
FIG. 5 depicts a data structure for the thread running on a cpu at the time of failure.

The failsoft list structure 160, as depicted in FIG. 5, includes an entry 162 for each cpu of the system and structure is preferably located in protected kernel memory space outside of cpu-set memory, accessible by all cpus but not by user programs. Each entry 162 includes a status code field 164 that holds a −1 if the cpu is disable, a 0 if enabled and a 1 if in panic mode processing. Each entry 162 also includes a thread pointer field 166 that contains a pointer to the thread running at the time of the hardware failure.

Figure 6:
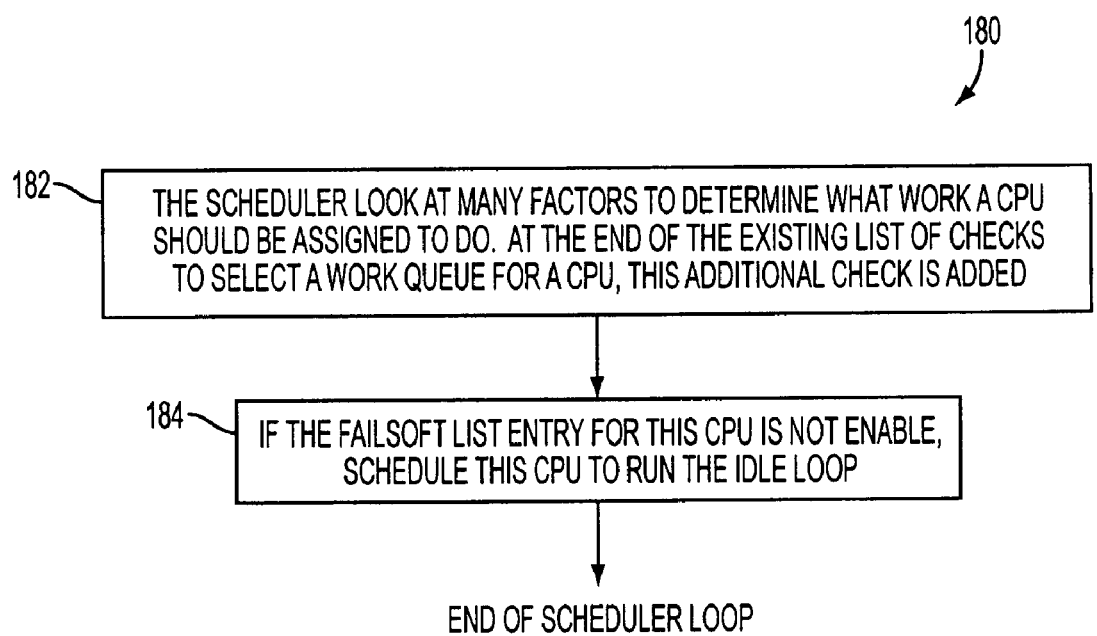
FIG. 6 shows part of the scheduler process.

Typically, after the error exception processing is completed, the scheduler process 180 (FIG. 6) execute a number of functions determine 182 what process should be performed next. To handle failsoft situations, this process 180 includes an added check 184 of the entry in the failsoft list structure (see FIG. 5) for this cpu to see if the CPU is enabled. If not, the scheduler sets the cpu to run in the idle loop.

Figure 7:
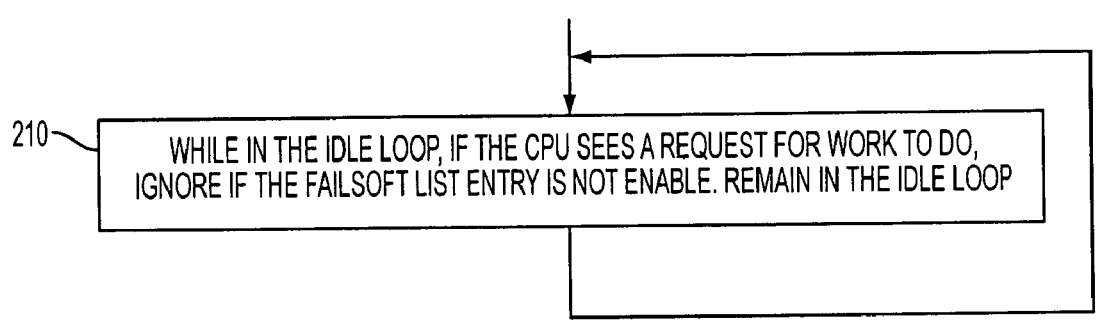
FIG. 7 shows part of the idle process.

The idle loop 210 (FIG. 7) for a failed processor equipped with a failsoft capability, the loop checks the failsoft list entry and stays in the idle loop when a request to do work is received and the entry is not enabled.

Figure 8:
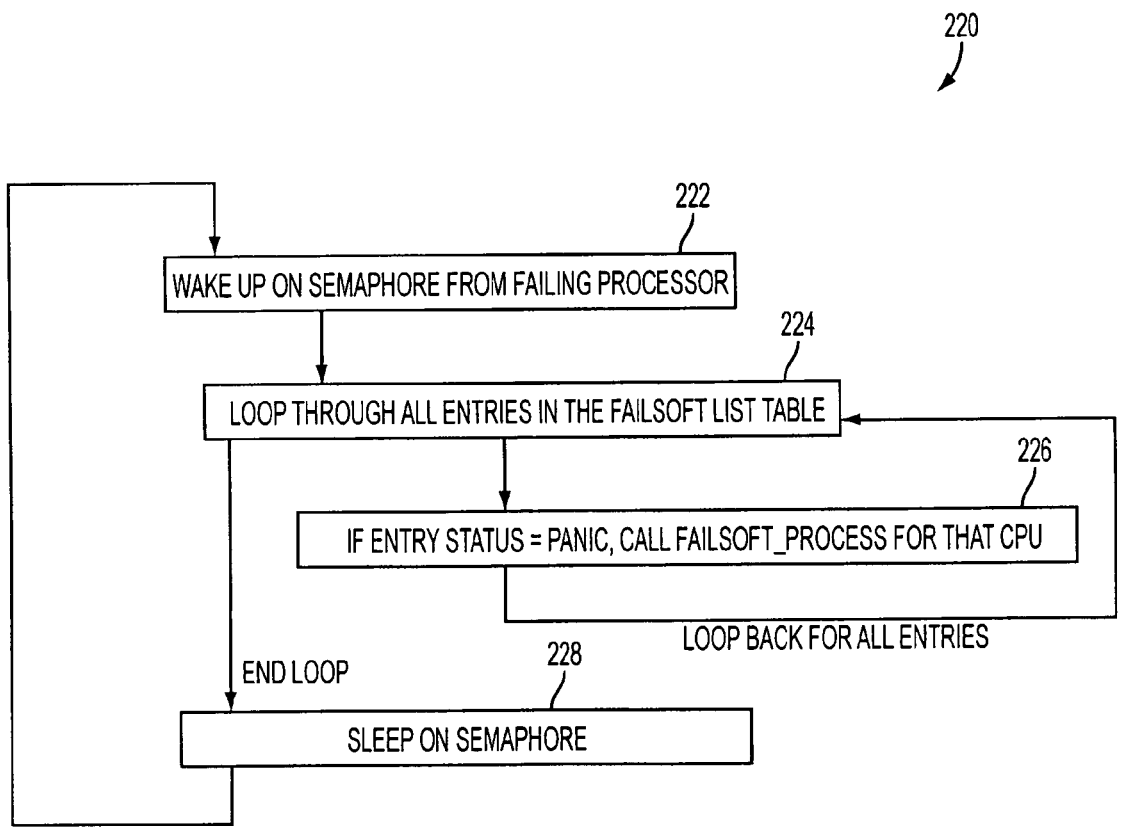
FIG. 8 depicts a rescue process.
Figure 9:
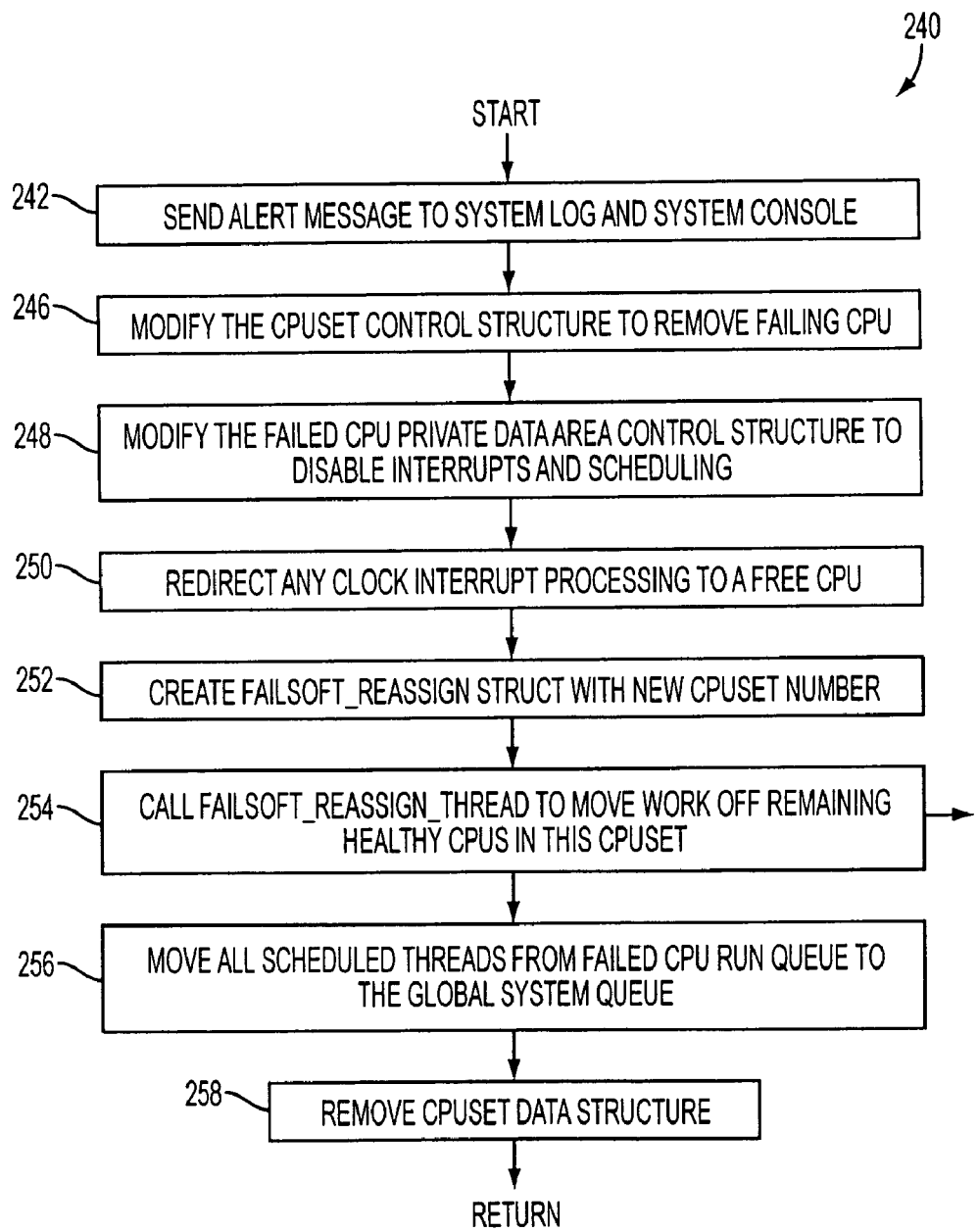
FIG. 9 shows a failsoft process.

When the control processor receives a semaphore message (from 144) that a processor has failed, the process of FIG. 8 is performed and the rescue process wakes-up 222. The rescue process loops 224 through the entries in the failsoft list 162. If an entry indicating a processor is in the panic mode is encountered, the failsoft process (FIG. 9) for that cpu is called 226. At the end of the loop, the rescue process goes back to sleep 228.

Figure 10:
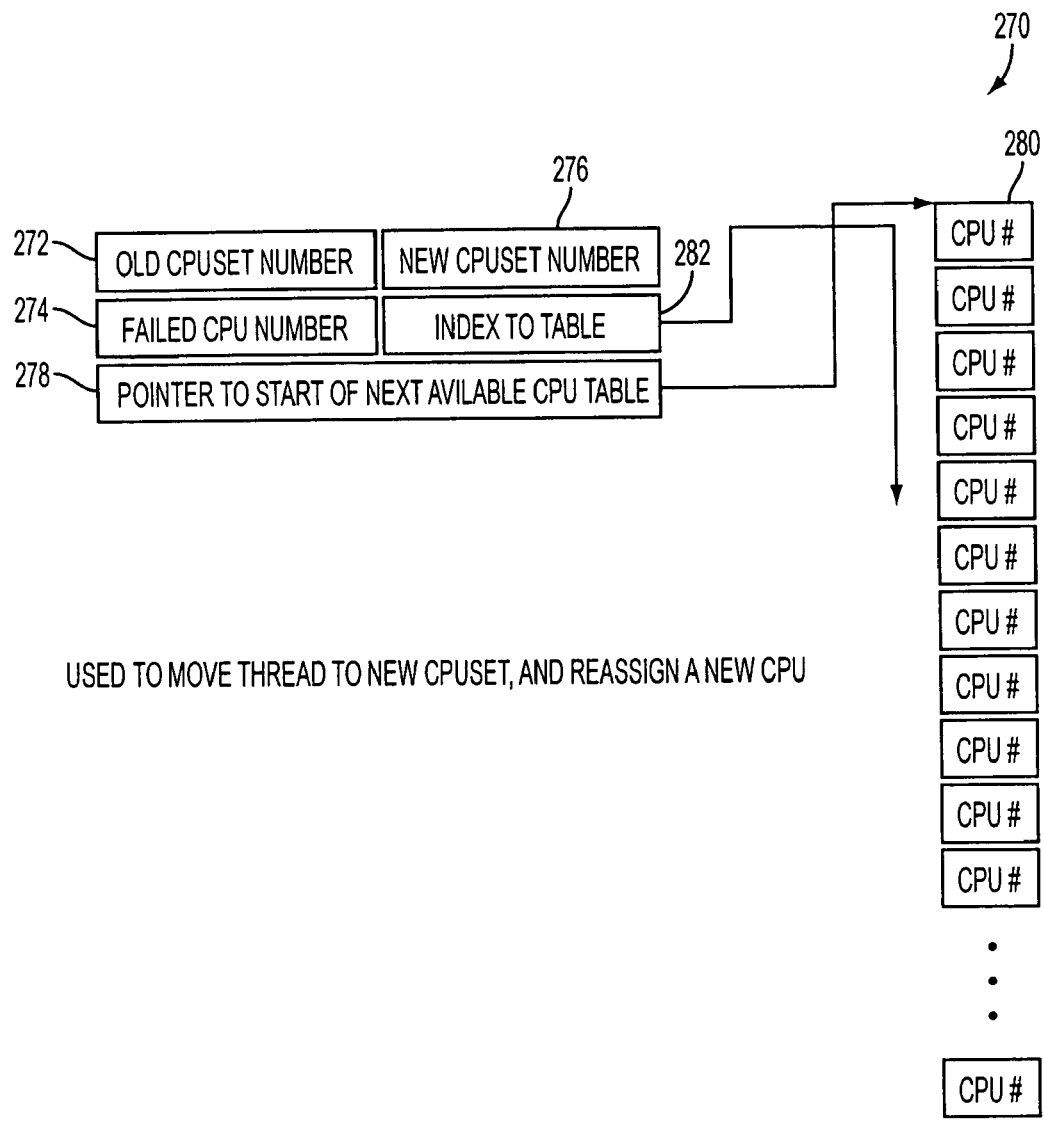
FIG. 10 depicts a reassignment data structure.
Figure 11:
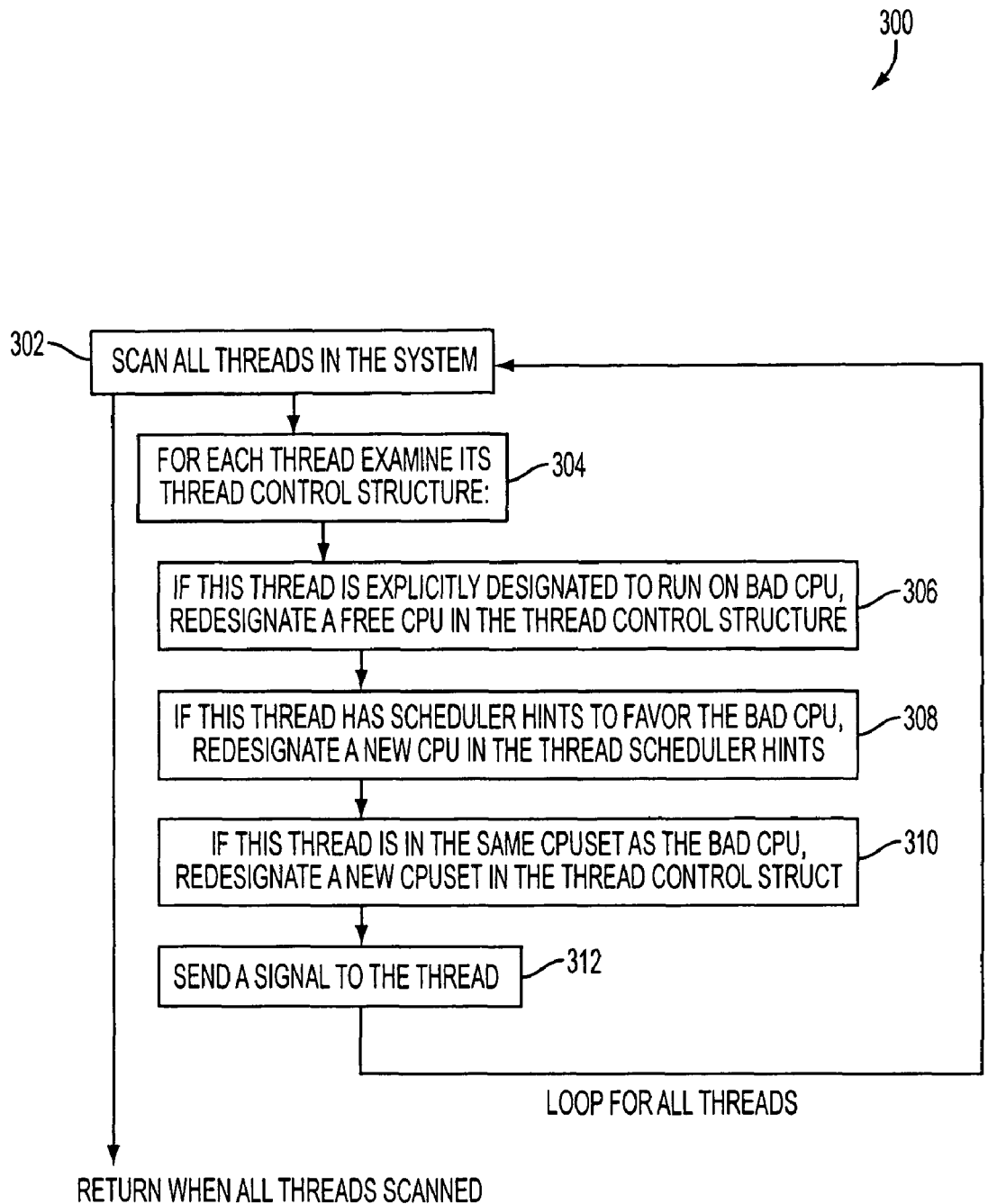
FIG. 11 shows a reassignment process.

The failsoft process 240 (FIG. 9) first places an alert in the system log and sends 242 the alert to the system console to alert the system operator, so that the hardware error can be repaired. Then, the conventional cpu-set control structure is modified 246 to remove the failed cpu (disabling interrupts, etc.) and the conventional private data area control structure for the failed cpu is modified 248 to disable interrupts and scheduling for the failed cpu. The clock interrupt processing for the failed cpu are redirected 250 to a free cpu in the global cpu-set. The control processor then creates 252 a failsoft reassignment structure (FIG. 10) for the failed cpu-set with a global cpu-set number. The processor than calls 254 a failsoft reassignment thread/process (FIG. 11) to move all work from the cpu-set with the failed processor to the global cpu-set. The control processor then moves 256 all scheduled threads of the failed cpu to the global system queue where they can be reassigned. The reassignment process is a change to the user thread control structure to designate the new cpu-set number, and a deletion of the currently assigned cpu number. Later when the scheduler is assigning work to cpus it task an appropriate processor to the thread. The cpu-set data structure of the failed cpu is removed 258. After the threads are reassigned for the good cpus of the cpu set containing the failed cpu, the good cpus are assigned to a global cpu-set so that they can be reassigned as needed.

The failsoft reassignment data structure 270 (FIG. 10), also located in protected kernel memory space outside of cpu-set memory, accessible by all cpus but not by user programs, includes the old cpu-set number 272 and the failed cpu number 274 allowing the set and failed cpu to be identified where the work threads. can be found and the new cpu-set number 276 where the threads are being moved. The structure 270 also includes a pointer 278 that points to the start of a table 280 that lists available cpus where cpus from the old set may be listed. To move through the entries of the table 280 and index field 282 is provided.

The reassign function 300 (FIG. 11) starts a loop where all of the threads of the system located in the protected kernel memory previously discussed are examined 302. When a thread is reviewed 304, the process determines 306 whether it is assigned to a failed cpu and, if so, the thread is set for running on a free cpu of the global cpu-set. If the thread has scheduler "hints" that direct the scheduler to run this thread on the bad cpu, the scheduler hint is reset 308 to a new cpu. If the thread is not for the bad cpu but in the cpu-set of the bad cpu, the thread is updated to reflect a new cpu in the global cpu-set based on the index into the table 280. The thread is then activated 312.

The large cpu-set systems have a clear advantage over other systems, such as a cluster system, by having a large single system image. The flexibility of cpu-sets allows a further advantage by dynamically configuring the processors into smaller nodes. Coupling these two important characteristics with the added capability of containing a fatal hardware error within a cpu-set delivers the reliability advantage of a traditional cluster, but with the superior performance of the large single system image.

It is possible for the system to disable the bad cpu and put the threads of that cpu in the global queue or reassign them to the other cpus of the set that contains the bad cpu. However, this is not preferred and it is preferred to reassign the threads to another set (the global cpu-set) because the failed cpu may have made the current cpu-set unusable.)

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of responding to errors in a high performance computing system that has a control processor executing an operating system, a plurality of computing processors for executing computational tasks within the operating system, and a memory that the control processor and the plurality of computing processors share, the method comprising:
   the operating system forming a first plurality of computing processors that cooperate to execute a first task within the operating system, and a second, non-overlapping plurality of computing processors that cooperate to execute a second task within the operating system, wherein the control processor is not assigned to the first or second plurality;
   determining, by a first computing processor in the first plurality, whether the first computing processor has encountered a problem;
   the operating system deactivating the first computing processor after the problem has occurred; and
   in response to the first computing processor determining that it has encountered the problem, the operating system using the shared memory to form a third plurality of computing processors that cooperate to continue executing the first task after the problem has occurred.

2. A method as recited in claim 1, wherein the second plurality of computing processors continue executing the second task after the problem has occurred.

3. A method as recited in claim 1, wherein the problem comprises a hardware error.

4. A method as recited in claim 1, further comprising transferring the first task being executed by the first plurality of processors to the third plurality of computing processors without terminating execution of the first task, after the problem has occurred.

5. A method as recited in claim 1, wherein deactivating comprises:
   idling and disabling the first computing processor; and
   sending an alert concerning the first computing processor.

6. A method as recited in claim 1, further comprising reassigning computing processors of the first plurality of computing processors other than the first computing processor to the third plurality of computing processors, after the problem has occurred.

7. A high performance computing system comprising:
   a memory;
   a plurality of computing processors, each computing processor sharing access to the memory, each computing processor being configured to determine if the computing processor has encountered a problem; and
   a control processor sharing access to the memory with the plurality of computing processors, the control processor being configured to execute operating system processes that:
   (a) form non-overlapping first and second pluralities of computing processors, the first plurality of computing processors cooperating to execute a first computing task, the second plurality of computing processors cooperating to execute a second computing task;
   (b) deactivate a first computing processor in the first plurality after the first computing processor has determined that a problem has occurred; and
   (c) in response to the first computing processor determining that it has encountered the problem, use the shared memory to form a third plurality of computing processors that cooperate to continue executing the first task after the problem has occurred.

8. A system as recited in claim 7, wherein the second plurality of computing processors continue executing the second task after the problem has occurred.

9. A system as recited in claim 7, wherein the problem comprises a hardware error.

10. A system as recited in claim 7, wherein the control processor is further configured to transfer the first task being executed by the first plurality of processors to the third plurality of computing processors without terminating execution of the first task, after the problem has occurred.

11. A system as recited in claim 7, wherein the control processor is configured to deactivate the computing processor by idling and disabling the first computing processor and sending an alert concerning the first computing processor.

12. A system as recited in claim 7, wherein the control processor is further configured to reassign computing processors of the first plurality of computing processors other than the first computing processor to the third plurality of computing processors, after the problem has occurred.

13. A computer program product for use in a high performance computing system that has a control processor executing an operating system, a plurality of computing processors for executing computational tasks within the operating system, and a memory that the control processor and the plurality of computing processors share, the computer program product comprising a non-transitory computer-readable storage having computer readable program code thereon, the computer readable program code comprising:

program code for forming a first plurality of computing processors that cooperate to execute a first task within the operating system, and a second, non-overlapping plurality of computing processors that cooperate to execute a second task within the operating system, wherein the control processor is not assigned to the first or second plurality;

program code for causing a first computing processor in the first plurality to determine whether the first computing processor has encountered a problem;

program code for causing the operating system to deactivate the first computing processor after the problem has occurred; and program code for causing the operating system to respond to the first computing processor encountering the problem by using the shared memory to form a third plurality of computing processors that cooperate to continue executing the first task after the problem has occurred.

14. A computer program product as recited in claim 13, further comprising program code for causing the second plurality of computing processors to continue executing the second task after the problem has occurred.

15. A computer program product as recited in claim 13, wherein the problem comprises a hardware error.

16. A computer program product as recited in claim 13, further comprising program code for transferring the first task being executed by the first plurality of processors to the third plurality of computing processors without terminating execution of the first task, after the problem has occurred.

17. A computer program product as recited in claim 13, further comprising program code for deactivating the first computing processor by idling and disabling the first computing processor and sending an alert concerning the first computing processor.

18. A computer program product as recited in claim 13, further comprising program code for reassigning computing processors of the first plurality of computing processors other than the first computing processor to the third plurality of computing processors, after the problem has occurred.

* * * * *